(12) United States Patent
Inam et al.

(10) Patent No.: US 11,888,308 B2
(45) Date of Patent: Jan. 30, 2024

(54) MODULAR FACTS DEVICES WITH EXTERNAL FAULT CURRENT PROTECTION

(71) Applicant: Smart Wires Inc., Union City, CA (US)

(72) Inventors: Haroon Inam, San Jose, CA (US); Debrup Das, Union City, CA (US); Amrit Iyer, St. Petersburg, FL (US)

(73) Assignee: Smart Wires Inc., Durham, NC (US)

( * ) Notice: Subject to any disclaimer, the term of this patent is extended or adjusted under 35 U.S.C. 154(b) by 0 days.

(21) Appl. No.: 17/592,331

(22) Filed: Feb. 3, 2022

(65) Prior Publication Data
US 2022/0158440 A1 May 19, 2022

Related U.S. Application Data

(63) Continuation of application No. 16/852,048, filed on Apr. 17, 2020, now Pat. No. 11,309,701, which is a
(Continued)

(51) Int. Cl.
*H02H 3/16* (2006.01)
*H02J 3/06* (2006.01)
(Continued)

(52) U.S. Cl.
CPC ............... *H02H 3/162* (2013.01); *H02H 7/16* (2013.01); *H02H 9/041* (2013.01); *H02J 3/06* (2013.01);
(Continued)

(58) Field of Classification Search
CPC ............ H02H 3/162; H02H 3/06; H02H 3/18; H02H 7/16
See application file for complete search history.

(56) References Cited

U.S. PATENT DOCUMENTS 2,237,812 A 4/1941 De Blieux
2,551,841 A 5/1951 Kepple et al.
(Continued)

FOREIGN PATENT DOCUMENTS

CH 660094 3/1987
CN 103256337 8/2013
(Continued)

OTHER PUBLICATIONS

Office Action dated Feb. 14, 2022; Indian Patent Application No. 201947049860; 5 pp. total.
(Continued)

*Primary Examiner* — Scott Bauer
(74) *Attorney, Agent, or Firm* — Womble Bond Dickinson (US) LLP (57) ABSTRACT

Flexible AC transmission system (FACTS) enabling distributed controls is a requirement for power transmission and distribution, to improve line balancing and distribution efficiency. These FACTS devices are electronic circuits that vary in the type of services they provide. All FACTS devices have internal circuitry to handle fault currents. Most of these circuits are unique in design for each manufacturer, which make these FACTS devices non-modular, non-interchangeable, expensive and heavy. One of the most versatile FACTS device is the static synchronous series compensator (SSSC), which is used to inject impedance into the transmission lines to change the power flow characteristics. The addition of integrated fault current handling circuitry makes the SSSC and similar FACTS devices unwieldy, heavy, and not a viable solution for distributed control. What is disclosed are modifications to FACTS devices that move the fault current protection external to the FACTS device and make them modular and re-usable.

20 Claims, 4 Drawing Sheets

Related U.S. Application Data continuation of application No. 15/694,605, filed on Sep. 1, 2017, now Pat. No. 10,666,038.

(60) Provisional application No. 62/527,873, filed on Jun. 30, 2017.

(51) Int. Cl.
   *H02J 3/18* (2006.01)
   *H02H 7/16* (2006.01)
   *H02H 9/04* (2006.01)
   *H02H 9/06* (2006.01)
   *H02H 7/26* (2006.01)

(52) U.S. Cl.
   CPC .............. *H02J 3/18* (2013.01); *H02J 3/1807* (2013.01); *H02H 7/26* (2013.01); *H02H 9/06* (2013.01)

(56) References Cited

U.S. PATENT DOCUMENTS

| | | |
|---|---|---|
| 3,556,310 A | 1/1971 | Loukotsky |
| 3,704,001 A | 11/1972 | Sloop |
| 3,750,992 A | 8/1973 | Johnson |
| 3,913,003 A | 10/1975 | Felkel |
| 4,025,824 A | 5/1977 | Cheatham |
| 4,057,736 A | 11/1977 | Jeppson |
| 4,103,853 A | 8/1978 | Bannan |
| 4,164,345 A | 8/1979 | Arnold et al. |
| 4,167,670 A | 9/1979 | Ingold |
| 4,188,536 A | 2/1980 | DallaPiazza |
| 4,200,899 A | 4/1980 | Volman et al. |
| 4,277,639 A | 7/1981 | Olsson |
| 4,286,207 A | 8/1981 | Spreadbury et al. |
| 4,293,902 A | 10/1981 | White |
| 4,322,817 A | 3/1982 | Kuster |
| 4,323,722 A | 4/1982 | Winkelman |
| 4,355,351 A | 10/1982 | Schwarz |
| 4,367,512 A | 1/1983 | Fujita |
| 4,514,950 A | 5/1985 | Goodson, Jr. |
| 4,562,360 A | 12/1985 | Fujimoto |
| 4,577,826 A | 3/1986 | Bergstrom et al. |
| 4,683,461 A | 7/1987 | Torre |
| 4,710,850 A | 12/1987 | Jahn et al. |
| 4,821,138 A | 4/1989 | Nakano et al. |
| 4,823,250 A | 4/1989 | Kolecki et al. |
| 4,903,927 A | 2/1990 | Farmer |
| 4,908,569 A | 3/1990 | Fest |
| 5,006,846 A | 4/1991 | Granville et al. |
| 5,023,768 A | 6/1991 | Collier |
| 5,032,738 A | 7/1991 | Vithayathil |
| 5,193,774 A | 3/1993 | Rogers |
| 5,270,913 A | 12/1993 | Limpaecher |
| 5,461,300 A | 10/1995 | Kappenman |
| 5,469,044 A | 11/1995 | Gyugyi et al. |
| 5,513,061 A | 4/1996 | Gelbien et al. |
| 5,610,501 A | 3/1997 | Nelson et al. |
| 5,648,888 A | 7/1997 | Le Francois et al. |
| 5,844,462 A | 12/1998 | Rapoport et al. |
| 5,854,729 A * | 12/1998 | Degeneff .............. H01H 33/59 361/13 |
| 5,875,235 A | 2/1999 | Mohajeri |
| 5,884,886 A | 3/1999 | Hageli |
| 5,886,888 A | 3/1999 | Akamatsu et al. |
| 5,892,351 A | 4/1999 | Faulk |
| 5,917,779 A | 6/1999 | Ralson et al. |
| 5,986,617 A | 11/1999 | McLellan |
| 6,061,259 A | 5/2000 | DeMichele |
| 6,075,349 A | 6/2000 | Okayama |
| 6,088,249 A | 7/2000 | Adamson |
| 6,134,105 A | 10/2000 | Lueker |
| 6,147,581 A | 11/2000 | Rancourt et al. |
| 6,198,257 B1 | 3/2001 | Belehradek et al. |
| 6,215,653 B1 | 4/2001 | Cochran et al. |
| 6,233,137 B1 | 5/2001 | Kolos et al. |
| 6,296,065 B1 | 10/2001 | Carrier |
| 6,335,613 B1 | 1/2002 | Sen et al. |
| 6,340,851 B1 | 1/2002 | Rinaldi et al. |
| 6,356,467 B1 | 3/2002 | Belehradek, Jr. |
| 6,397,156 B1 | 5/2002 | Bachmann et al. |
| 6,459,998 B1 * | 10/2002 | Hoffman .................. H02H 5/10 361/64 |
| 6,460,626 B2 | 10/2002 | Carrier |
| 6,486,569 B2 | 11/2002 | Couture |
| 6,675,912 B2 | 1/2004 | Carrier |
| 6,727,604 B2 | 4/2004 | Couture |
| 6,831,377 B2 | 12/2004 | Yampolsky et al. |
| 6,895,373 B2 | 5/2005 | Garcia et al. |
| 6,914,195 B2 | 7/2005 | Archambault et al. |
| 7,090,176 B2 | 8/2006 | Chavot et al. |
| 7,091,703 B2 | 8/2006 | Folts et al. |
| 7,105,952 B2 | 9/2006 | Divan et al. |
| 7,193,338 B2 | 3/2007 | Ghali |
| 7,352,564 B2 | 4/2008 | Courtney |
| 7,440,300 B2 | 10/2008 | Konishi et al. |
| 7,453,710 B2 | 11/2008 | Baurle et al. |
| 7,460,931 B2 | 12/2008 | Jacobson |
| 7,642,757 B2 | 1/2010 | Yoon et al. |
| 7,688,043 B2 | 3/2010 | Toki et al. |
| 7,729,147 B1 | 6/2010 | Wong et al. |
| 7,834,736 B1 | 11/2010 | Johnson et al. |
| 7,835,128 B2 | 11/2010 | Divan et al. |
| 7,932,621 B1 | 4/2011 | Spellman |
| 8,019,484 B2 | 9/2011 | Korba et al. |
| 8,189,351 B2 | 5/2012 | Chung et al. |
| 8,249,836 B2 | 8/2012 | Yoon et al. |
| 8,270,558 B2 | 9/2012 | Dielissen |
| 8,310,099 B2 | 11/2012 | Engel et al. |
| 8,395,916 B2 | 3/2013 | Harrison |
| 8,401,709 B2 | 3/2013 | Cherian et al. |
| 8,441,778 B1 | 5/2013 | Ashmore |
| 8,497,592 B1 | 7/2013 | Jones |
| 8,680,720 B2 | 3/2014 | Schauder et al. |
| 8,681,479 B2 | 3/2014 | Englert et al. |
| 8,767,427 B2 | 7/2014 | Wallmeier |
| 8,816,527 B1 | 8/2014 | Ramsay et al. |
| 8,825,218 B2 | 9/2014 | Cherian et al. |
| 8,867,244 B2 | 10/2014 | Trainer et al. |
| 8,872,366 B2 | 10/2014 | Campion et al. |
| 8,890,373 B2 | 11/2014 | Savolainen et al. |
| 8,896,988 B2 | 11/2014 | Subbaiahthever et al. |
| 8,922,038 B2 | 12/2014 | Bywaters et al. |
| 8,957,752 B2 | 2/2015 | Sharma et al. |
| 8,996,183 B2 | 3/2015 | Forbes, Jr. |
| 9,065,345 B2 | 6/2015 | Rigbers et al. |
| 9,099,893 B2 | 8/2015 | Schmiegel et al. |
| 9,124,100 B2 | 9/2015 | Ukai et al. |
| 9,124,138 B2 | 9/2015 | Mori et al. |
| 9,130,458 B2 | 9/2015 | Crookes et al. |
| 9,172,246 B2 | 10/2015 | Ramsay et al. |
| 9,178,456 B2 | 11/2015 | Smith et al. |
| 9,185,000 B2 | 11/2015 | Mabilleau et al. |
| 9,207,698 B2 | 12/2015 | Forbes, Jr. |
| 9,217,762 B2 | 12/2015 | Kreikebaum et al. |
| 9,246,325 B2 | 1/2016 | Coca Figuerola et al. |
| 9,325,173 B2 | 4/2016 | Varma et al. |
| 9,331,482 B2 | 5/2016 | Huang |
| 9,332,602 B2 | 5/2016 | Roberts et al. |
| 9,473,028 B1 | 10/2016 | Hoyt |
| 9,563,218 B2 | 2/2017 | Hall et al. |
| 9,659,114 B2 | 5/2017 | He et al. |
| 9,735,702 B2 | 8/2017 | Hu et al. |
| 9,843,176 B2 | 12/2017 | Gibson et al. |
| 2002/0005668 A1 | 1/2002 | Couture |
| 2002/0042696 A1 | 4/2002 | Garcia et al. |
| 2003/0006652 A1 | 1/2003 | Couture |
| 2003/0098768 A1 | 5/2003 | Hoffmann et al. |
| 2004/0153215 A1 | 8/2004 | Kearney et al. |
| 2004/0217836 A1 | 11/2004 | Archambault et al. |
| 2005/0052801 A1 | 3/2005 | Ghali |
| 2005/0071050 A1 | 3/2005 | Chow et al. |
| 2005/0073200 A1 | 4/2005 | Divan et al. |
| 2005/0194944 A1 | 9/2005 | Folts et al. |

(56) References Cited

U.S. PATENT DOCUMENTS

| | | |
|---|---|---|
| 2005/0205726 A1 | 9/2005 | Chavot et al. |
| 2006/0085097 A1 | 4/2006 | Courtney |
| 2007/0135972 A1 | 6/2007 | Jacobson |
| 2007/0250217 A1 | 10/2007 | Yoon et al. |
| 2008/0103737 A1 | 5/2008 | Yoon et al. |
| 2008/0157728 A1 | 7/2008 | Toki et al. |
| 2008/0177425 A1 | 7/2008 | Korba et al. |
| 2008/0205088 A1 | 8/2008 | Chung et al. |
| 2008/0278976 A1 | 11/2008 | Schneider et al. |
| 2008/0310069 A1 | 12/2008 | Divan et al. |
| 2009/0243876 A1 | 10/2009 | Lilien et al. |
| 2009/0281679 A1 | 11/2009 | Taft et al. |
| 2010/0014322 A1 | 1/2010 | Harrison |
| 2010/0026275 A1 | 2/2010 | Walton |
| 2010/0094477 A1* | 4/2010 | Berggren ............... H02J 3/242 700/297 |
| 2010/0177450 A1 | 7/2010 | Holcomb et al. |
| 2010/0213765 A1 | 8/2010 | Engel et al. |
| 2010/0302744 A1 | 12/2010 | Englert et al. |
| 2011/0060474 A1 | 3/2011 | Schmiegel et al. |
| 2011/0095162 A1 | 4/2011 | Parduhn et al. |
| 2011/0106321 A1 | 5/2011 | Cherian et al. |
| 2011/0172837 A1 | 7/2011 | Forbes, Jr. |
| 2012/0105023 A1 | 5/2012 | Schauder et al. |
| 2012/0146335 A1 | 6/2012 | Bywaters et al. |
| 2012/0205981 A1 | 8/2012 | Varma et al. |
| 2012/0242150 A1 | 9/2012 | Ukai et al. |
| 2012/0255920 A1 | 10/2012 | Shaw et al. |
| 2012/0293920 A1 | 11/2012 | Subbaiahthever et al. |
| 2013/0002032 A1 | 1/2013 | Mori et al. |
| 2013/0033103 A1 | 2/2013 | McJunkin et al. |
| 2013/0044407 A1 | 2/2013 | Byeon et al. |
| 2013/0094264 A1 | 4/2013 | Crookes et al. |
| 2013/0128636 A1 | 5/2013 | Trainer et al. |
| 2013/0166085 A1 | 6/2013 | Cherian et al. |
| 2013/0169044 A1 | 7/2013 | Stinessen et al. |
| 2013/0182355 A1 | 7/2013 | Coca Figuerola et al. |
| 2013/0184894 A1 | 7/2013 | Sakuma et al. |
| 2013/0200617 A1 | 8/2013 | Smith et al. |
| 2013/0249321 A1 | 9/2013 | Gao et al. |
| 2013/0277082 A1 | 10/2013 | Hyde et al. |
| 2013/0345888 A1 | 12/2013 | Forbes, Jr. |
| 2014/0008982 A1 | 1/2014 | Powell et al. |
| 2014/0025217 A1 | 1/2014 | Jin et al. |
| 2014/0032000 A1 | 1/2014 | Chandrashekhara et al. |
| 2014/0111297 A1 | 4/2014 | Earhart et al. |
| 2014/0129195 A1 | 5/2014 | He et al. |
| 2014/0132229 A1 | 5/2014 | Huang |
| 2014/0153383 A1 | 6/2014 | Mabilleau et al. |
| 2014/0188689 A1 | 7/2014 | Kalsi et al. |
| 2014/0203640 A1 | 7/2014 | Stinessen |
| 2014/0210213 A1 | 7/2014 | Campion et al. |
| 2014/0246914 A1 | 9/2014 | Chopra et al. |
| 2014/0247554 A1 | 9/2014 | Sharma et al. |
| 2014/0266288 A1 | 9/2014 | Trabacchin et al. |
| 2014/0268458 A1 | 9/2014 | Luciani et al. |
| 2014/0312859 A1 | 10/2014 | Ramsay et al. |
| 2014/0327305 A1 | 11/2014 | Ramsay et al. |
| 2014/0347158 A1 | 11/2014 | Goeke et al. |
| 2015/0012146 A1 | 1/2015 | Cherian et al. |
| 2015/0029764 A1 | 1/2015 | Peng |
| 2015/0051744 A1 | 2/2015 | Mitra |
| 2015/0184415 A1 | 7/2015 | Bushore |
| 2015/0214716 A1* | 7/2015 | Baumann ............... H02H 3/006 361/87 |
| 2015/0222111 A1* | 8/2015 | Magnusson .......... H01H 33/006 361/91.5 |
| 2015/0226772 A1 | 8/2015 | Kreikebaum et al. |
| 2015/0236509 A1 | 8/2015 | Divan et al. |
| 2015/0244307 A1 | 8/2015 | Cameron |
| 2015/0270689 A1 | 9/2015 | Gibson et al. |
| 2015/0365011 A1 | 12/2015 | Ilves |
| 2016/0036231 A1 | 2/2016 | Ramsay et al. |
| 2016/0036341 A1 | 2/2016 | Jang et al. |
| 2017/0163036 A1 | 6/2017 | Munguia et al. |
| 2017/0169928 A1 | 6/2017 | Carrow et al. |
| 2017/0170660 A1 | 6/2017 | Hu et al. |
| 2017/0237255 A1 | 8/2017 | Inam et al. |
| 2018/0156858 A1 | 6/2018 | Bianchi |

FOREIGN PATENT DOCUMENTS

| | | |
|---|---|---|
| CN | 203668968 | 6/2014 |
| JP | 2002-199563 | 7/2002 |
| JP | 2005-045888 | 2/2005 |
| JP | 2015-086692 | 5/2015 |
| KR | 10-1053514 | 8/2011 |
| WO | WO-2005/067117 | 7/2005 |
| WO | WO-2008/082820 | 7/2008 |
| WO | WO-2014/035881 | 3/2014 |
| WO | WO-2014/074956 | 5/2014 |
| WO | WO-2014/099876 | 6/2014 |
| WO | WO-2015/074538 | 5/2015 |
| WO | WO-2015/119789 | 8/2015 |

OTHER PUBLICATIONS

"Extended European Search Report dated Sep. 9, 2019; European Patent Application No. 19153095.5", Sep. 9, 2019.

"International Search Report and Written Opinion of the International Searching Authority dated Aug. 14, 2018; International Application No. PCT/US2018/034476", Aug. 14, 2018.

Albasri, Fadhel A. et al., "Performance Comparison of Distance Protection Schemes for Shung-FACTS Compensated Transmission Lines", IEEE Transactions on Power Delivery, vol. 22, No. 4, Oct. 2007, pp. 2116-2125.

Amin, S. M. et al., "Toward a Smart Grid: Power Delivery for the 21st Century", IEEE power & energy magazine, vol. 3, No. 5, Sep./Oct. 2005, pp. 34-41.

Angeladas, Emmanouil, "High Voltage Substations Overview (part 1)", SIEMENS, Jan. 24, 2013, pp. 1-8.

Aquino-Lugo, Angel A., "Distributed and Decentralized Control of the Power Grid", Ph.D. Dissertation, University of Illinois at Urbana-Champaign, 2010, 172 pp. total.

Bhaskar, M. A. et al., "Impact of FACTS devices on distance protection in Transmission System", 2014 IEEE National Conference on Emerging Trends in New & Renewable Energy Sources and Energy Management (NCET NRES EM), Dec. 16, 2014, pp. 52-58.

Dash, P. K. et al., "Digital Protection of Power Transmission Lines in the Presence of Series Connected FACTS Devices", IEEE Power Engineering Society Winter Meeting, 2000, pp. 1967-1972.

Divan, D. M., "Nondissipative Switched Networks for High-Power Applications", Electronics Letters, vol. 20, No. 7, Mar. 29, 1984, pp. 277-279.

Funato, Hirohito et al., "Realization of Negative Inductance Using Variable Active-Passive Reactance (VAPAR)", IEEE Transactions on Power Electronics, vol. 12, No. 4, Jul. 1997, pp. 589-596.

Gyugyi, Laszlo et al., "Status Synchronous Series Compensator: A Solid-State Approach to the Series Compensation of Transmission Lines", IEEE Transactions on Power Delivery, vol. 12, No. 1, Jan. 1997, pp. 406-417.

Gyugyi, Laszlo et al., "The Interline Power Flow Controller Concept: A New Approach to Power Flow Management in Transmission Systems", IEEE Transactions on Power Delivery, vol. 14, No. 3, Jul. 1999, pp. 1115-1123.

Kavitha, M. et al., "Integration of FACTS into Energy Storage Systems for Future Power Systems Applications", International Journal of Advanced Research in Electrical, Electronics and Instrumentation Engineering, vol. 2, Issue 2, Feb. 2013, pp. 800-810.

Kumbhar, Mahesh M. et al., "Smart Grid: Advanced Electricity Distribution Network", IOSR Journal of Engineering (IOSRJEN), vol. 2, Issue 6, Jun. 2012, pp. 23-29.

Lambert, Frank C., "Power Flow Control", ISGT Europe, 2014, Istanbul, Turkey, Oct. 13, 2014, pp. 1-15.

Lehmkoster, Carsten, "Security Constrained Optimal Power Flow for an Economical Operation of FACTS-Devices in Liberalized Energy Markets", IEEE Transactions on Power Delivery, vol. 17, No. 2, Apr. 2002, pp. 603-608.

(56) References Cited

OTHER PUBLICATIONS

Mali, Bhairavanath N. et al., "Performance Study of Transmission Line Ferranti Effect and Fault Simulation Model Using MATLAB", International Journal of Innovative Research in Electrical, Electronics, Instrumentation and Control Engineering, vol. 4, Issue 4, Apr. 2016, pp. 49-52.

Mutale, Joseph et al., "Transmission Network Reinforcement Versus FACTS: An Economic Assessment", IEEE Transactions on Power Systems, vol. 15, No. 3, Aug. 2000, pp. 961-967.

Ramchurn, Sarvapali D. et al., "Putting the 'Smarts' into the Smart Grid: A Grand Challenge for Artificial Intelligence", Communications of the ACM, vol. 55, No. 4, Apr. 2012, pp. 86-97.

Reddy, D. M. et al., "FACTS Controllers Implementation in Energy Storage Systems for Advanced Power Electronic Applications—A Solution", American Journal of Sustainable Cities and Society, Issue 2, vol. 1, Jan. 2013, pp. 36-63.

Renz, B. A. et al., "AEP Unified Power Flow Controller Performance", IEEE Transactions on Power Delivery, vol. 14, No. 4, Oct. 1999, pp. 1374-1381.

Ribeiro, P. et al., "Energy Storage Systems", Chapters 1-2.4 of Section entitled "Energy Storage Systems" in Electrical Engineering—vol. III, edited by Kit Po Wong, Encyclopedia of Life Support Systems (EOLSS) Publications, Dec. 13, 2009, 11 pp. total.

Samantaray, S. R., "A Data-Mining Model for Protection of FACTS-Based Transmission Line", IEEE Transactions on Power Delivery, vol. 28, No. 2, Apr. 2013, pp. 612-618.

Schauder, C. D. et al., "Operation of the Unified Power Flow Controller (UPFC) Under Practical Constraints", IEEE Transactions on Power Delivery, vol. 13, No. 2, Apr. 1998, pp. 630-639.

Siemens SAS, , "Portable Power Solutions, "Plug and play" High Voltage E-Houses, skids and mobile high voltage substations up to 420 kV", Nov. 2015, 8 pp. total.

Swain, S. C. et al., "Design of Static Synchronous Series Compensator Based Damping Controller Employing Real Coded Genetic Algorithm", International Journal of Electrical, Computer, Energetic, Electronic and Communication Engineering, vol. 5, No. 3, 2011, pp. 399-407.

Xue, Yiyan et al., "Charging Current in Long Lines and High-Voltage Cables—Protection Application Considerations", 67th Annual Georgia Tech Protective Relaying Conference, Atlanta, Georgia, May 8-10, 2013, pp. 1-17.

\* cited by examiner

MODULAR FACTS DEVICES WITH EXTERNAL FAULT CURRENT PROTECTION

CROSS-REFERENCE TO RELATED APPLICATIONS

This application is a continuation of U.S. patent application Ser. No. 16/852,048 filed Apr. 17, 2020, which is a continuation of U.S. patent application Ser. No. 15/694,605 filed Sep. 1, 2017, which claims the benefit of U.S. Provisional Patent Application No. 62/527,873 filed Jun. 30, 2017, the disclosures of which are incorporated herein by reference.

BACKGROUND OF THE INVENTION

1. Field of the Invention

The present invention relates to systems and methods for flexible AC transmission systems (FACTS) and specifically to use of distributed power transmission and distribution control by static synchronous series compensators and other FACTs devices.

2. Prior Art

FACTS based distributed control of transmission lines and connected distributed generation capabilities and loads have become very critical for improving the efficiency of the power grid. In flexible AC transmission systems (FACTS), power flow control devices vary in the type of services they can provide. Devices operate in either series or shunt modes, and are highly complex and sophisticated pieces of machinery that require long planning cycles and preparation before installation.

Many of the FACTS devices use high voltage semiconductor-based power electronic converters to control the required parameters, such as line current, bus voltage, and more. Although converter-based FACTS devices provide more granular and faster control than electro-mechanical devices such as Phase Shifting Transformers, the former have significant limitations in fault-handling capability. The cost and complexity of the fault-handling strategy and circuit design in a FACTS device is one of the significant limitations and is considered one of the main deterrents for large-scale adoption of the FACTS technology.

Furthermore, most FACTS devices today are custom-built for specific applications, thus, no plug-and-play solution exists today. The lack of a solution is due to the unique design of the fault handling capability designed and implemented by individual suppliers of the FACTS systems and modules.

During a typical fault on the power grid very high currents appear on the transmission lines of the grid. These fault conditions can be short lived, such as those due to a lightning strike or they can be extended such as those due to ground shorts. Since the electronic components and thyristor used in todays' FACTS devices are prone to failure when such currents are impressed on them, these conditions must be handled by the fault protection circuitry. The high, short-duration faults are generally diverted away from sensitive semi-conductor switches (like IGBTs) using fast acting, more robust switches such as SCRs, electro-mechanical contactors, etc. In additions the circuits may also use metal oxide varistors (MOVs) to limit voltage rise. MOVs have a resistance value that reduces with the voltage applied across it.

Figure 1:
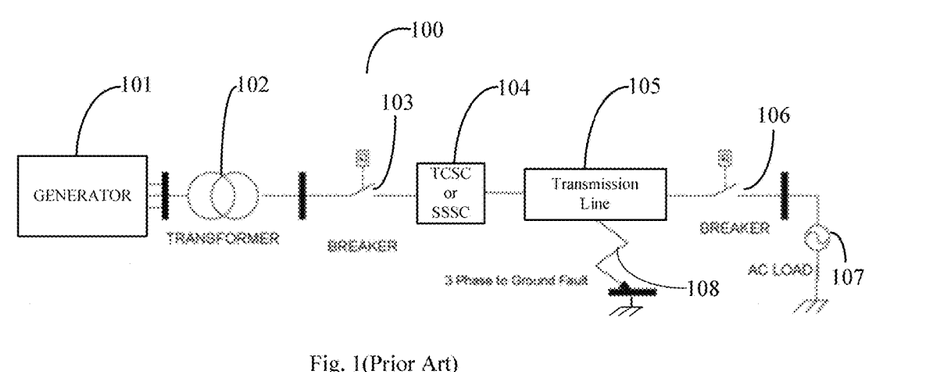
FIG. 1 is a prior art system block diagram 100 of thyristor controlled series compensator (TCSC) with breaker protections as part of the power grid system.

FIG. 1 shows a prior art implementation 100 of a thyristor controlled Series compensator (TCSC) or a synchronous static series compensator (SSSC) 104 that includes the fault current protection as part of the power grid system 100. The power system comprises: the generator 101, the transformer 102, for stepping up the voltage for transmission over the transmission line 105. The circuit breaker (CB) 103 is used to isolate the generator 101 from the transmission line 105 and any FACTS devices like TCSC or SSSC 104 in case of ground short 108. A second breaker 106 is used to isolate the power grid from the load 107. During regular operation, the TCSC or the SSSC 104 provide the capability for the line to be efficiently used for transfer of power.

Figure 2:
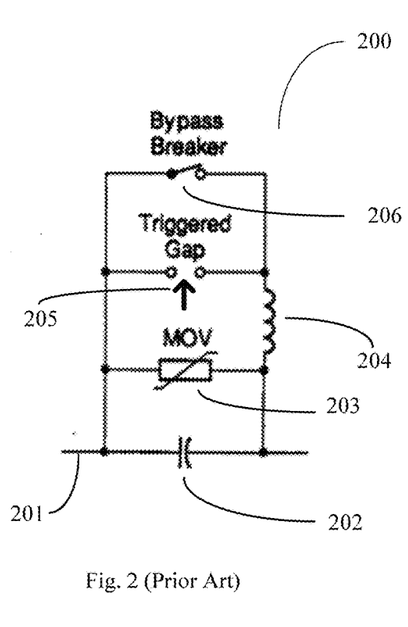
FIG. 2 is a prior art block diagram 200 of a series capacitor bank including the fault current protection components.

FIG. 2 is a prior art example of the series capacitive compensation for the inductance of the power lines. As can be seen the protection circuit associated with the capacitor 202 in series with the power line 201 comprise the MOV bank 203 and a triggered gap 205, which may be a vacuum bottle, in series with an inductance 204 used to limit the current through the vacuum bottle or in the case of longer time periods the bypass CB 206.

Figure 3:
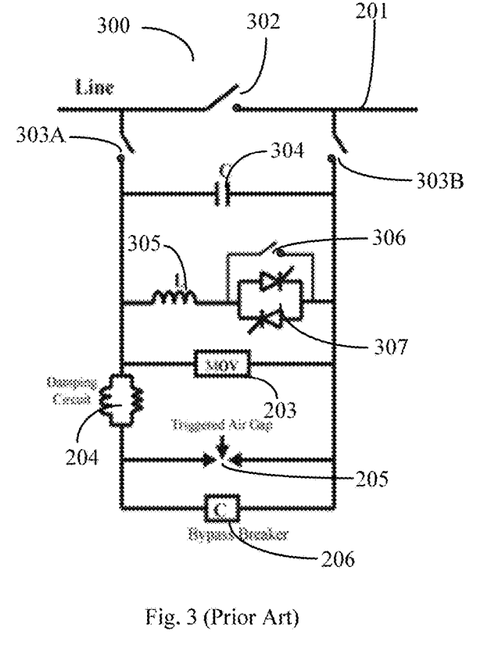
FIG. 3 is an exemplary prior art block diagram 300 showing the internal components including fault protection components of the TCSC of FIG. 1. (Prior Art)

FIG. 3 is a prior art example of a single TCSC unit 307 with the associated fault current protection circuits. The TCSC 307 with the re-closer switch 306, and in combination with the inductor 305 in parallel with the capacitor 'C' 304 is able to inject both capacitive or inductive impedances on the power line 201 based on the firing of the thyristors, the control being provided by the firing angle and duration. The protection circuitry includes the MOV 203 stack, the triggered air/vacuum gap 205, and the bypass breaker 206. The triggered air gap 205 and the bypass breaker have the damping circuit 204 to reduce oscillations and provide a current limit. In addition to the fault current protection the FIG. 3 also shows the circuit breakers 303 A and 303 B which allow the TCSC module to be disconnected from the line 201 and a re-closer breaker 302 for reconnecting the TCSC when a fault is repaired.

These prior art FACTS based power flow control modules show the control circuits with the fault protection associated with it. The fault protection makes the control units large and unwieldy. It is hence only efficient to have the power flow control modules in substations and not usable effectively in distributed control applications.

It will be ideal if the fault handling capability can be removed from inside the FACTS systems and modules to an external protection scheme. The individual FACTS modules and systems then become modular and capable of plug and play. In addition the modular FACTS devices are lighter and smaller and can thus be useable in distributed applications on the grid.

BRIEF DESCRIPTION OF THE DRAWINGS

The drawings are made to point out and distinguish the invention from the prior art. The objects, features and advantages of the invention are detailed in the description taken together with the drawings.

DETAILED DESCRIPTION OF THE PREFERRED EMBODIMENTS

The primary change to the FACTS devices is moving the unit-level fault protection module external to the FACTS device. This provides:

Substantial reduction in volume and weight of the FACTS devices allowing them to be used in (1) distributed applications; (2) applications where a plurality of FACTS devices need to be configured and used as a group. In that regard, the reduction in volume allows heat generated within the FACTS devices to more readily pass out.

The system reliability is improved due to reduction in the number of modules/components used, that result in reducing the number of failure points or nodes within the implemented modules and sub-systems.

The removal of custom designed fault protection modules enables standardization of the FACTS modules for use in distributed applications requiring lower cost.

Flexible AC transmission system (FACTS) enabling distributed controls is a requirement for power transmission and distribution, to improve line balancing and distribution efficiency. These FACTS devices are electronic circuits that vary in the type of services they provide. All FACTS devices have internal circuitry to handle fault currents. Most of these circuits are unique in design for each manufacturer, which make these FACTS devices non-modular, non-interchangeable, expensive and heavy. One of the most versatile FACTS device, the static synchronous series compensator (SSSC) is used to inject impedance into the transmission lines to change the power flow characteristics. The addition of integrated fault current handling circuitry makes the SSSCs and similar FACTS devices unwieldy, heavier and not viable as a solution for distributed control. What is disclosed are modifications to FACTS devices that move the fault current protection external to the FACTS device and make them modular and re-usable.

Figure 4:
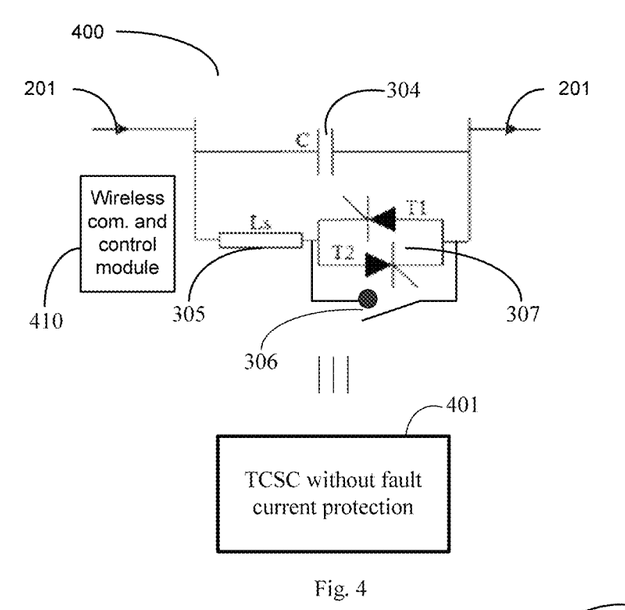
FIG. 4 is an exemplary block diagram 400 of TCSC without fault current protection and its block representation 401 as per an embodiment of the current invention.

FIG. 4 shows a TCSC module 400 wherein the fault current protection circuit has been removed. The TCSC module 400 is connected in series with power line 201. Module 400 comprise two branches in parallel, one branch being the capacitor 'C' 304 and the second branch being the inductor 305 in series with the thyristor switching unit 307. A recloser switch 306 is connected in parallel with the thyristor switching unit 307 to shunt the unit when reclosure is necessary. By controlling the firing frequency and firing angle of the thyristors in the thyristor switching unit 307 the module is able to impress either an inductive or a capacitive impedance on the power line 201 to control the power flow on the line 201. The control instructions and coordination of the TCSC 400 in distributed situations mandate coordinated action with other TCSC modules 400 and any fault protection units external to the TCSC module 400. A dedicated communication module 410 communicably links the TCSC module 400 to other FACTS modules, external fault protection units and control and coordination facility. Similar communication modules are used with all TCSC modules, SSSC modules and FCPM modules (fault current protection modules such as illustrated in FIGS. 6-9, though not shown therein so as to not obscure the points being illustrated. A representative block of the TCSC module 400 is shown as block 401.

Figure 5:
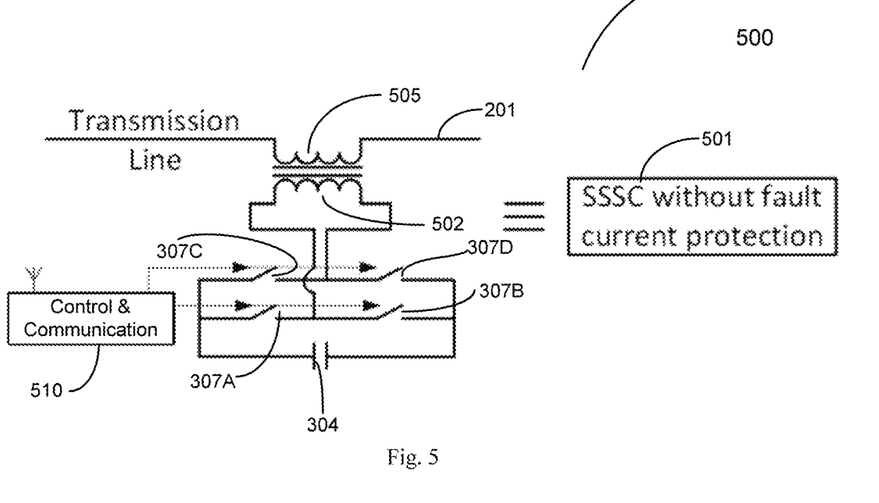
FIG. 5 is an exemplary block diagram 500 of an SSSC without fault current protection and its block representation 501 as per an embodiment of the current invention.

Similar to FIG. 4, FIG. 5 shows the SSSC module 500 with the fault protection circuitry removed. The SSSC 500 is shown as being coupled to the power line 201 by an injection transformer, having a primary winding 505 in series with the line 201 and a secondary winding 502. Similar to the TCSC module 400, the SSSC module 500 contain the HV switches 301A to 307D connected across the secondary 502 of the injection transformer as well as a capacitor C 304 in parallel as shown. A dedicated communication module 510 allow the SSSC module 500 to coordinate with other FACTS control devices, external fault protection units and control and coordination facility in a manner similar to the TCSC module 400. The SSSC 500 module is represented as a block by the equivalent block 501.

Figure 6:
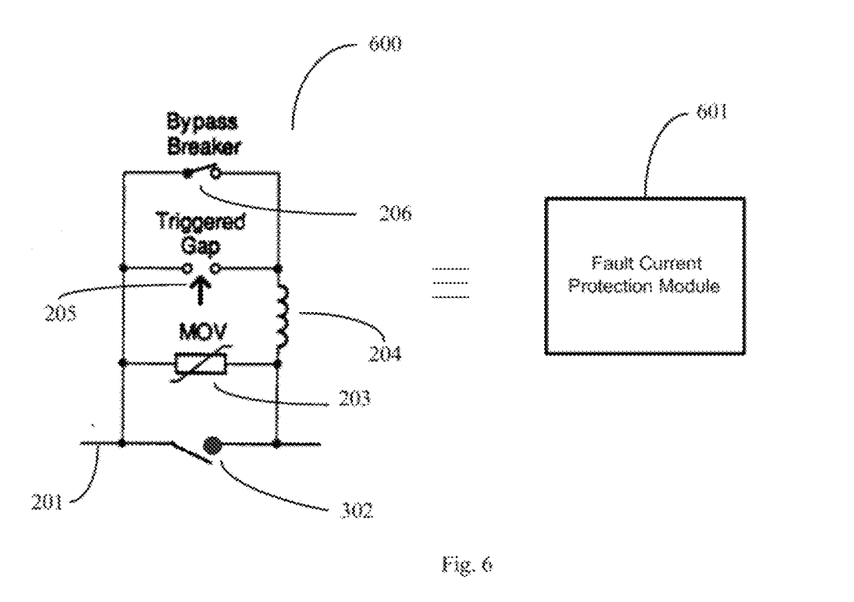
FIG. 6 is an exemplary block diagram 600 of an implementation of the fault current protection module and its single block representation 601 as per an embodiment of the present invention.

FIG. 6 shows an exemplary external fault current protection module (FCPM) 600. The FCPM 600 is connected to the line 201 spanning the circuits to be protected. It comprise the MOV 203 to handle the short duration faults, surges and transients, a triggered gap 205 in series with a current limiting inductor 204 to handle longer faults, and a bypass switch 206 to handle short circuits and ground short conditions. It also has a recloser switch 302 to enable the system to be reset when the faults are removed. The exemplary external FCPM 600 is also represented by the FCPM block 601. An FCPM 601 may be hung from a transmission line or supported by a separate support, such as a separate ground based or tower support, or as a further alternative, the FCPM as well as the TCSCs and/or SSSCs may be located in a substation, such as by way of example, a substation provided specifically for that purpose.

As discussed previously, each manufacturer of the prior art FACTS device custom designed the FCPM to suit their design requirements and manufacturing capabilities. By removing the non-standardized fault current protection devices from the prior art TCSC 300 and the prior art SSSC, new modular and standardized TCSC 401 and SSSC 501 that handle the desired function are made available from all FACTS manufacturers. These standardized TCSC 401 and SSSC 501 are much smaller in size, lower in weight, and usable in a distributed fashion. Having the external FCPM 601 separate from the modular TCSC 401 and SSSC 501 makes arranging a plurality of these standardized FACTS modules in parallel or in series with a single external FCPM 601 module to handle power transfer requirements of the power grid, reducing the cost and efficiency of such implementation.

One of the challenges that arise when a plurality of the FACTS modules are connected in parallel or in series, as a group, is the need for coordinating their operation to achieve the operational goals. High speed and secure inter module, group to group and group to facility control is essential for the proper operation of the inter linked FACTS devices and the single connected fault current protection module. Secure and dedicated communication techniques including line of sight wireless communication using 60 and 80 Ghz bands, direct communication using lasers etc. The challenge also extends to the operational integration requirement for control between the plurality of FACTS devices connected. This includes decision on which of the connected devices should be active at any point in time and when the various protection devices should become active.

Figure 7:
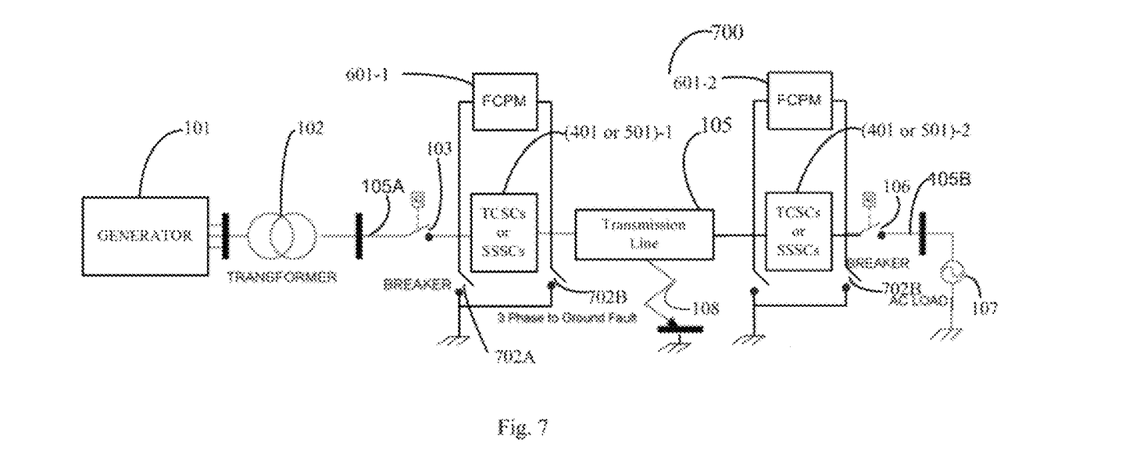
FIG. 7 is an exemplary power grid system block diagram 700 with TCSC 401 or SSSC 501 with external Fault current protection 601 and bypass and ground isolation protections.

FIG. 7 shows an exemplary block diagram 700 of implementation of the external FCPM 601 with FACTS modules like TCSC 401 or SSSC 501 modules on a power grid. The block diagram 700 is similar to the FIG. 1 block diagram 100 and shows two sets of modular FACTS units such as TCSC 401 and SSSC 501 used instead of a single unit having the fault protection built in. Each of the modular plurality of FACTS units are protected by one FCPM 601-1.

Figure 8:
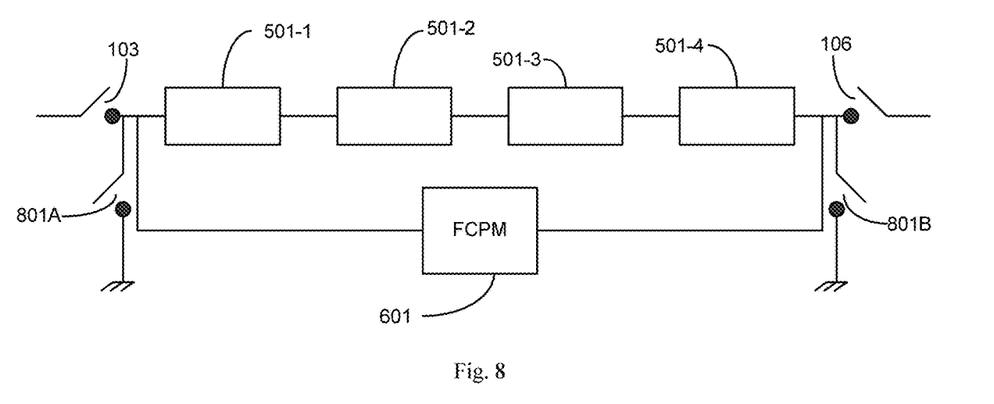
FIG. 8 is an exemplary diagram showing multiple SSSCs 501s deployed in series being protected by an external fault current protection module 601, the SSSCs further being enabled for isolation and ground connection using breakers.

FIG. 8 shows a block diagram 800 of one arrangement of the FACTS units such as SSSC 501-1 to 501-4 in a series connection with one external FCPM 601. Two circuit breakers 103 and 106 are shown for isolating the modular FACTS units and the faulty line section between a first bus 105A and a second bus 105B from the rest of the transmission system in case of failure 108. Two additional ground connected breakers 801A and 801B are also provided to allow discharging of the set of FACTS modules and the section of the isolated transmission line when disconnected from the transmission system using breakers 103 and 106.

Figure 9:
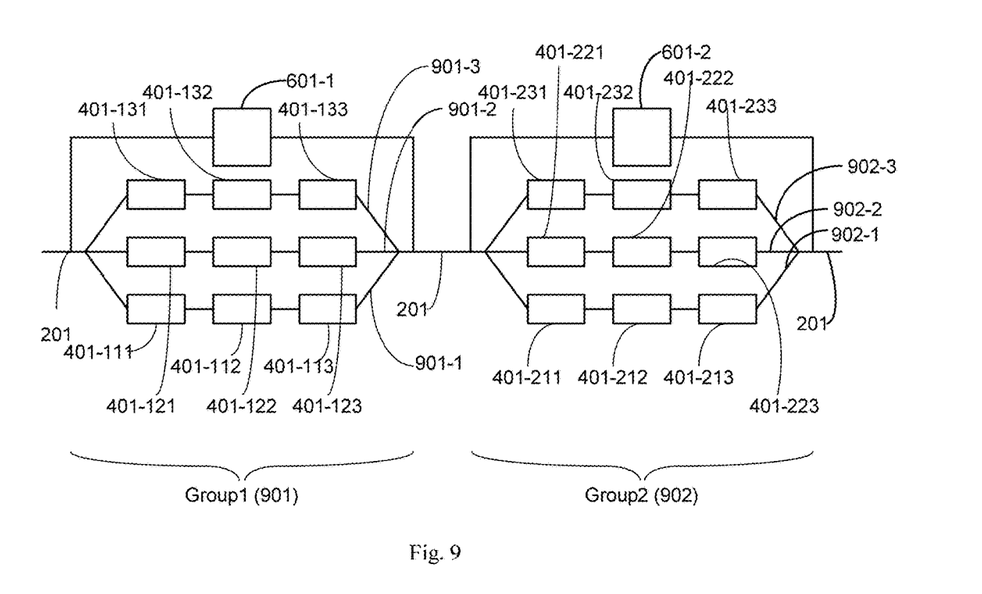
FIG. 9 is an exemplary deployment of two groups of TCSCs in series parallel configuration with external fault current protection.

FIG. 9 shows a block diagram 900 showing an alternate way for arranging the plurality of FACTS devices such as TCSC 401 in a parallel serial connection. Each of the two groups of nine TCSC 401 devices 901 and 902 shown as example are connected in strings of three devices and arranged in three parallel interconnected strings. The devices are designated as 401-gsp; where g is the group, s is the string and p is the position of the device on the string. Hence a TCSC 401 in group 2, on the second string at second position will be 401-222 and a TCSC 401 of the 1st group in the 3rd string first position will have a designation 401-131 and so on. Each group of nine TCSC 401s are shown as being protected by a single external FCPM 601.

The organization of the groups with the capability to isolate the protected groups provide a big advantage to the serviceability of the grid system. It is hence possible if a failure occurs in the FCPM 601 module or any of the individual FACTS 401 modules, to isolate the failed module and replace the same with a similar module that is standardized and pre-tested. The selective enablement of groups of FACTS 401 devices for power flow control and serviceability without disrupting normal operations is hence fully enabled by the modular replacement capability and standardization of the FACTS 401 and FCPM 601 modules used.

The removal of the fault current protection module, by design, from each FACTS device has numerous advantages. It reduces cost by eliminating unnecessary duplication of heavy circuitry, itself very advantageous when the FACTS devices are to be hung from the transmission line. It reduces the volume (wind forces) and the cooling requirements of each FACTS device. It also allows and encourages standardization of the FACTS modules in performance and control, and similarly allows independent selection of a fault current protection module design for broad use, again standardizing their performance, communication and control requirements. Using a fault current protection module having a recloser switch such as switch 302 (FIG. 6), a protected group of FACTS devices can be functionally isolated from the respective transmission line by closing the recloser switch to remove or divert transmission line current around that group of FACTS devices, which may be useful in normal operation, and particularly useful upon a failure or excess heating of a respective FACTS device in that group.

Even though the invention disclosed is described using specific implementation, it is intended only to be exemplary and non-limiting. The practitioners of the art will be able to understand and modify the same based on new innovations and concepts, as they are made available. The invention is intended to encompass these modifications.

Thus, the present invention has a number of aspects, which aspects may be practiced alone or in various combinations or sub-combinations, as desired. Also while certain preferred embodiments of the present invention have been disclosed and described herein for purposes of exemplary illustration and not for purposes of limitation, it will be understood by those skilled in the art that various changes in form and detail may be made therein without departing from the spirit and scope of the invention.

What is claimed is:

1. A system for fault current protection in a power transmission and distribution system, the system comprising:
   a plurality of flexible alternating current transmission systems (FACTS) devices, each without fault current protection, connected to and distributed on a power transmission line for power flow control; and
   a fault current protection device connected to the power transmission line to protect the FACTS devices from fault currents, wherein the fault current protection device is external to the FACTS devices and connected in parallel with the FACTS devices.

2. The system of claim 1, wherein the fault current protection device includes:
   a metal oxide varistor (MOV) for of: short duration faults, surges, or transient events,
   a bypass breaker for short circuits and ground fault conditions, and
   a recloser switch for reset when the fault currents are removed.

3. The system of claim 2, wherein the fault current protection device further includes a triggered gap and a current limiting inductor, the triggered gap connecting in series with the current limiting inductor for long duration faults.

4. The system of claim 2, wherein the MOV, the bypass breaker and the recloser switch are connected in parallel.

5. The system of claim 2, wherein the bypass breaker isolates the FACTS devices from the power transmission line by removing or diverting transmission line current from the FACTS devices.

6. The system of claim 1, wherein the FACTS devices comprise static synchronous series compensators (SSSCs) or thyristor controlled series compensators (TCSCs).

7. The system of claim 1, wherein the FACTS devices are implemented as part of an impedance injection module for generation and injection of inductive or capacitive impedance into a segment of the power transmission line.

8. The system of claim 1, wherein the fault current protection device is supported by the power transmission line or supported by a support structure.

9. The system of claim 1, wherein the power transmission line includes a first breaker between a first bus and the FACTS devices, and a second breaker between the FACTS devices and a second bus on the power transmission line to isolate a segment of the power transmission line between the first and second breakers from the power transmission and distribution system.

10. The system of claim 1, wherein each of the FACTS devices is in communication with a communication module that enables the FACTS device to coordinate with other FACTS devices, the fault current protection device, and a control and coordination facility, to control power transmission on the power transmission line.

11. The system of claim 9, wherein the segment of the power transmission line between the first and second breakers comprises third and fourth breakers that are closable to discharge the segment of the power transmission line to ground.

12. A method for fault current protection in a power transmission and distribution system, the method comprising:
- connecting a plurality of flexible alternating current transmission systems (FACTS) devices, each without fault current protection, to a power transmission line to control power flow; and
- connecting a fault current protection device to the power transmission line to protect the FACTS devices from fault currents, wherein the fault current protection device is external to the FACTS devices and connected in parallel with the FACTS devices.

13. The method of claim 12, wherein the fault current protection device includes:
- a metal oxide varistor (MOV) for of: short duration faults, surges, or transient events,
- a bypass breaker for short circuits and ground fault conditions,
- a recloser switch for reset when the fault currents are removed,
- a current limiting inductor, and
- a triggered gap connecting in series with the current limiting inductor for long duration faults.

14. The method of claim 13, wherein the MOV, the bypass breaker and the recloser switch are connected in parallel.

15. The method of claim 13, wherein the bypass breaker isolates the FACTS devices from the power transmission line by removing or diverting transmission line current from the FACTS devices.

16. The method of claim 12, wherein the FACTS devices comprise static synchronous series compensators (SSSCs) or thyristor controlled series compensators (TCSCs).

17. The method of claim 12, wherein the FACTS devices are implemented as part of an impedance injection module for generation and injection of inductive or capacitive impedance into a segment of the power transmission line.

18. The method of claim 12, wherein the fault current protection device is supported by the power transmission line or supported by a support structure.

19. The method of claim 12, wherein each of the FACTS devices is in communication with a communication module that enables the FACTS device to coordinate with other FACTS devices, the fault current protection device, and a control and coordination facility, to control power transmission on the power transmission line.

20. A system, comprising:
- a first group of flexible alternating current transmission systems (FACTS) devices, each without fault current protection, connected to a power transmission line;
- a second group of FACTS devices connected to the power transmission line, each without fault current protection, wherein the second group of FACTS devices is connected in series with the first group of FACTS devices on the power transmission line;
- a first fault current protection device connected to the power transmission line to protect the first group of FACTS devices from fault currents, wherein the first fault current protection device is external to the first and second groups of FACTS devices, and is connected in parallel with the first group of FACTS devices; and
- a second fault current protection device connected to the power transmission line to protect the second group of FACTS devices from fault currents, wherein the second fault current protection device is external to the first and second groups of FACTS devices, and is connected in parallel with the second group of FACTS devices.

\* \* \* \* \*